United States Patent
Liu et al.

(10) Patent No.: US 12,549,551 B2
(45) Date of Patent: Feb. 10, 2026

(54) METHOD AND APPARATUS FOR PROCESSING MULTI-CLOUD SERVICE, ELECTRONIC DEVICE AND STORAGE MEDIUM

(71) Applicant: BEIJING YOUZHUJU NETWORK TECHNOLOGY CO., LTD., Beijing (CN)

(72) Inventors: Jiawei Liu, Beijing (CN); Zhihua Cao, Beijing (CN); Cai Xu, Beijing (CN); Ziqi Yang, Beijing (CN); Yisheng Jiang, Beijing (CN); Jian Wang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 317 days.

(21) Appl. No.: 18/498,805

(22) Filed: Oct. 31, 2023

(65) Prior Publication Data
US 2024/0146735 A1 May 2, 2024

(30) Foreign Application Priority Data
Oct. 31, 2022 (CN) .......................... 202211350056.0

(51) Int. Cl.
*H04L 9/40* (2022.01)
*G06F 21/53* (2013.01)

(52) U.S. Cl.
CPC .............. *H04L 63/10* (2013.01); *G06F 21/53* (2013.01)

(58) Field of Classification Search
CPC ................................. H04L 63/10; G06F 21/53
See application file for complete search history.

(56) References Cited

U.S. PATENT DOCUMENTS

| | | | |
|---|---|---|---|
| 10,678,602 B2* | 6/2020 | Manglik | ................... G06F 8/61 |
| 2016/0285828 A1* | 9/2016 | Keohane | ............. H04L 63/0263 |
| 2017/0187820 A1* | 6/2017 | Vangala | .................. H04L 45/54 |
| 2019/0238422 A1* | 8/2019 | Raney | ..................... H04L 41/20 |
| 2019/0327303 A1* | 10/2019 | Chen | ................... H04L 67/1097 |
| 2020/0065129 A1* | 2/2020 | Yoshida | .............. G06F 9/45558 |
| 2020/0293216 A1* | 9/2020 | Su | .......................... G06F 3/0604 |
| 2023/0049501 A1* | 2/2023 | Xu | ......................... G06F 9/5027 |
| 2025/0321784 A1* | 10/2025 | Liu | ........................ G06F 16/953 |

FOREIGN PATENT DOCUMENTS

WO WO-2023186002 A1 * 10/2023 ........... H04L 47/783

\* cited by examiner

*Primary Examiner* — Chau Le
(74) *Attorney, Agent, or Firm* — Alleman Hall LLP

(57) ABSTRACT

A method and an apparatus for processing a multi-cloud service, an electronic device, a storage medium and a system are provided. The method includes acquiring a target multi-cloud scheduling instruction, where the target multi-cloud scheduling instruction includes a multi-cloud scheduling demand and description of schedule-required information; transmitting an application for the schedule-required information to a target user in a trusted environment based on the description of the schedule-required information, to obtain the schedule-required information; generating a scheduling strategy in the trusted environment based on the target multi-cloud scheduling instruction and the schedule-required information; and initiating scheduling to a target cloud vendor based on the scheduling strategy to obtain a scheduling result.

20 Claims, 7 Drawing Sheets

METHOD AND APPARATUS FOR PROCESSING MULTI-CLOUD SERVICE, ELECTRONIC DEVICE AND STORAGE MEDIUM

CROSS-REFERENCE TO RELATED APPLICATIONS

This application claims priority to Chinese application NO. 202211350056.0, titled "METHOD AND APPARATUS FOR PROCESSING MULTI-CLOUD SERVICE, ELECTRONIC DEVICE AND STORAGE MEDIUM", filed Oct. 31, 2022, with the China National Intellectual Property Administration, which is incorporated herein by reference in its entirety.

FIELD

The present disclosure is directed to the technical field of multi-cloud services, and in particular to a method and an apparatus for processing a multi-cloud service, an electronic device, a storage medium and a system.

BACKGROUND

Multi-cloud entails two different vendors of public clouds, rather than storing all data in one pluralistic cloud vendor or only using local infrastructure. A service that implements the above functions is referred to as a multi-cloud service. The multi-cloud service involves the use of user identifiers and information for encryption. The requirement on credibility of the multi-cloud service involving such information is high due to strict requirements for the use of such information.

SUMMARY

In view of this, a method and an apparatus for processing a multi-cloud service, an electronic device, a storage medium and a system are provided according to embodiments of the present disclosure.

A method for processing a multi-cloud service is provided according to a first aspect of the present disclosure. The method includes:
  acquiring a target multi-cloud scheduling instruction, where the target multi-cloud scheduling instruction includes a multi-cloud scheduling demand and description of schedule-required information;
  transmitting, in a trusted environment, an application for the schedule-required information to a target user based on the description of the schedule-required information, to obtain the schedule-required information;
  generating a scheduling strategy in the trusted environment based on the target multi-cloud scheduling instruction and the schedule-required information; and
  initiating scheduling to a target cloud vendor based on the scheduling strategy to obtain a scheduling result.

A method for processing a multi-cloud service is provided according to a second aspect of the present disclosure. The method includes:
  acquiring a multi-cloud scheduling instruction, where the multi-cloud scheduling instruction includes a multi-cloud scheduling demand and user information of a target user;
  identifying the user information and determining description of schedule-required information;
  generating a target multi-cloud scheduling instruction based on the description of the schedule-required information and the multi-cloud scheduling demand; and
  transmitting the target multi-cloud scheduling instruction to the trusted environment, for performing the multi-cloud scheduling to obtain a scheduling result.

An apparatus for processing a multi-cloud service is provided according to a third aspect of the present disclosure. The apparatus includes:
  a first acquiring module, configured to acquire a target multi-cloud scheduling instruction, where the target multi-cloud scheduling instruction includes a multi-cloud scheduling demand and description of schedule-required information;
  a first transmitting module, configured to transmit, in a trusted environment, an application for the schedule-required information to a target user based on the description of the schedule-required information, to obtain the schedule-required information;
  a first generating module, configured to generate a scheduling strategy in the trusted environment based on the target multi-cloud scheduling instruction and the schedule-required information; and
  a scheduling initiating module, configured to initiate scheduling to a target cloud vendor based on the scheduling strategy to obtain a scheduling result.

An apparatus for processing a multi-cloud service is provided according to a fourth aspect of the present disclosure. The apparatus includes:
  a second acquiring module, configured to acquire a multi-cloud scheduling instruction, where the multi-cloud scheduling instruction includes a multi-cloud scheduling demand and user information of a target user;
  an identifying module, configured to identify the user information and determine description of schedule-required information;
  a second generating module, configured to generate a target multi-cloud scheduling instruction based on the description of the schedule-required information and the multi-cloud scheduling demand; and
  a second transmitting module, configured to transmit the target multi-cloud scheduling instruction to the trusted environment, for performing the multi-cloud scheduling to obtain a scheduling result.

An electronic device is provided according to a fifth aspect of the present disclosure. The electronic device includes a memory and a processor. The memory is communicatively connected to the processor. The memory stores computer instructions. The processor, when executing the computer instructions, performs the method for processing a multi-cloud service according to the first aspect or any one of the embodiments of the first aspect, or the second aspect or any one of the embodiments of the second aspect.

A non-transitory computer-readable storage medium is provided according to a sixth aspect of the present disclosure. The non-transitory computer-readable storage medium stores computer instructions. The computer instructions are used to cause a computer to perform the method for processing a multi-cloud service according to the first aspect or any one of the embodiments of the first aspect, or the second aspect or any one of the embodiments of the second aspect.

A system for processing a multi-cloud service is provided according to a seventh aspect of the present disclosure. The system includes a multi-cloud server and a trusted environment executor. The multi-cloud server is configured to perform the method for processing a multi-cloud service according to the second aspect or any one of the embodiments of the second aspect. The trusted environment executor is connected to the multi-cloud server. The trusted environment executor is configured to perform the method for processing a multi-cloud service according to the first aspect or any one of the embodiments of the first aspect.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description only illustrate some embodiments of the present disclosure. Those skilled in the art may obtain other drawings according to the provided drawings without any creative work.

DETAILED DESCRIPTION

In order to make the objectives, technical solutions, and advantage of embodiments of the present disclosure clearer, the technical solutions in the embodiments of the present disclosure are described clearly and completely in conjunction with the drawings of the embodiments of the present disclosure hereinafter. It is apparent that the described embodiments are only some rather than all embodiments of the present disclosure. Based on the embodiments of the present disclosure, all other embodiments obtained by those skilled in the art without creative efforts shall fall within the protection scope of the present disclosure.

In a scenario of processing a multi-cloud service, a user A uses three cloud vendors A, B, and C. If the user A uses the multi-cloud service, schedule-required information in the cloud vendors A, B, and C is required to be hosted to a multi-cloud service platform. The schedule-required information includes but is not limited to a user identifier (that is, Access Key Id, referred to as AK for short) and a key (that is, Secret Access Key, referred to as SK for short) used by the user to encrypt an authentication string and to verify the authentication string.

The user A having a large amount of business may pay tens of millions CNY for cloud consumption per year, while the multi-cloud service of the type of software-as-a-service (SaaS) can only charge a maximum annual fee of hundreds of thousands CNY, which brings great risk inequality. That is, the user hosts the business in value of tens of millions CNY to the service that only costs a hundred thousand CNY per year. Therefore, the user puts forward extremely strict requirement on the usage of AK and SK for the multi-cloud service A. Based on this, a method for processing a multi-cloud service is provided according to the present disclosure, in which the schedule-required information is processed in a trusted environment. A tamper-resistant feature of the trusted environment may ensure the credibility of the schedule-required information.

The trusted environment is a trusted execution environment (referred to as TEE for short), which adopts a hardware-based security mechanism and loads codes and data participating in calculations into the trusted environment protected by a CPU, providing protection of confidentiality and integrity.

Figure 1:
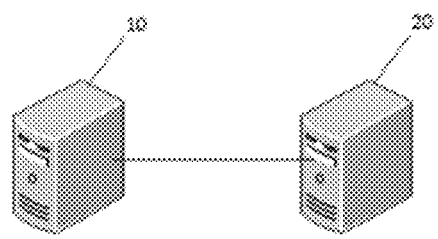
FIG. 1 is a schematic diagram of a system for processing a multi-cloud service according to an embodiment of the present disclosure.

A system for processing a multi-cloud service is provided according to an embodiment of the present disclosure. As shown in FIG. 1, the system includes a multi-cloud server 10 and a trusted environment executor 20. The multi-cloud server 10 is connected to the trusted environment executor 20. The multi-cloud server 10 is configured to receive a multi-cloud scheduling instruction initiated by a user, generate a target multi-cloud scheduling instruction in response to the multi-cloud scheduling instruction of the user, and transmit the target multi-cloud scheduling instruction to the trusted environment executor 20 for performing multi-cloud scheduling to obtain a scheduling result. The trusted environment executor 20 feeds the scheduling result to the multi-cloud server 10, and then the multi-cloud server 10 feeds the scheduling result to the user. From the above processing process, it can be seen that the multi-cloud server is not involved in the processing of the multi-cloud scheduling, and the processing is implemented by the trusted environment executor 20, that is, the specific content of the schedule-required information is processed by the trusted environment executor 20, ensuring the credibility of the schedule-required information.

Figure 2:
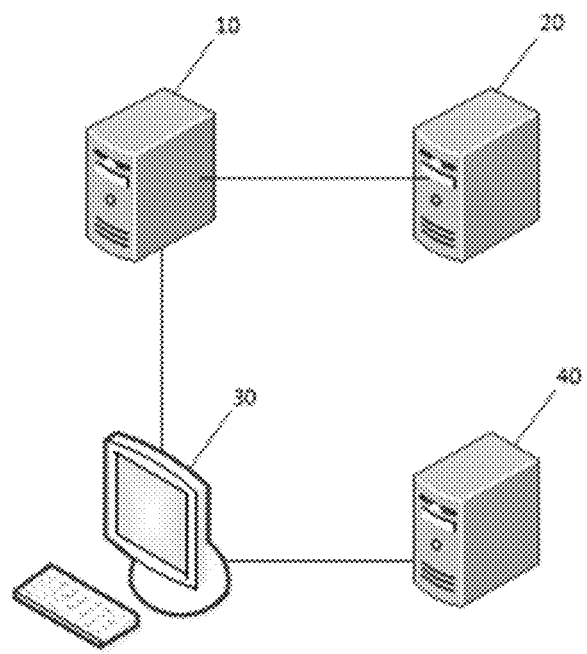
FIG. 2 is a schematic diagram of a system for processing a multi-cloud service according to an embodiment of the present disclosure.

In some embodiments, as shown in FIG. 2, the system for processing a multi-cloud service further includes a user terminal 30 and a target cloud vendor 40. The user terminal 30 is required to apply for the schedule-required information from the target cloud vendor 40 before the multi-cloud scheduling is processed. When the trusted environment executor 20 processes the multi-cloud scheduling, the trusted environment executor 20 applies for the schedule-required information from the user terminal 30, which can further reflect that the content of the schedule-required information is only exposed in the user terminal 30 and the trusted environment executor 20.

A method for processing a multi-cloud service is provided according to an embodiment of the present disclosure. It should be noted that steps shown in the flow chart may be executed in a computer system including a set of computer-executable instructions. In addition, although steps are described or shown in logic order in the flow chart, the steps may be performed in an order different from the order herein in some cases.

Figure 3:
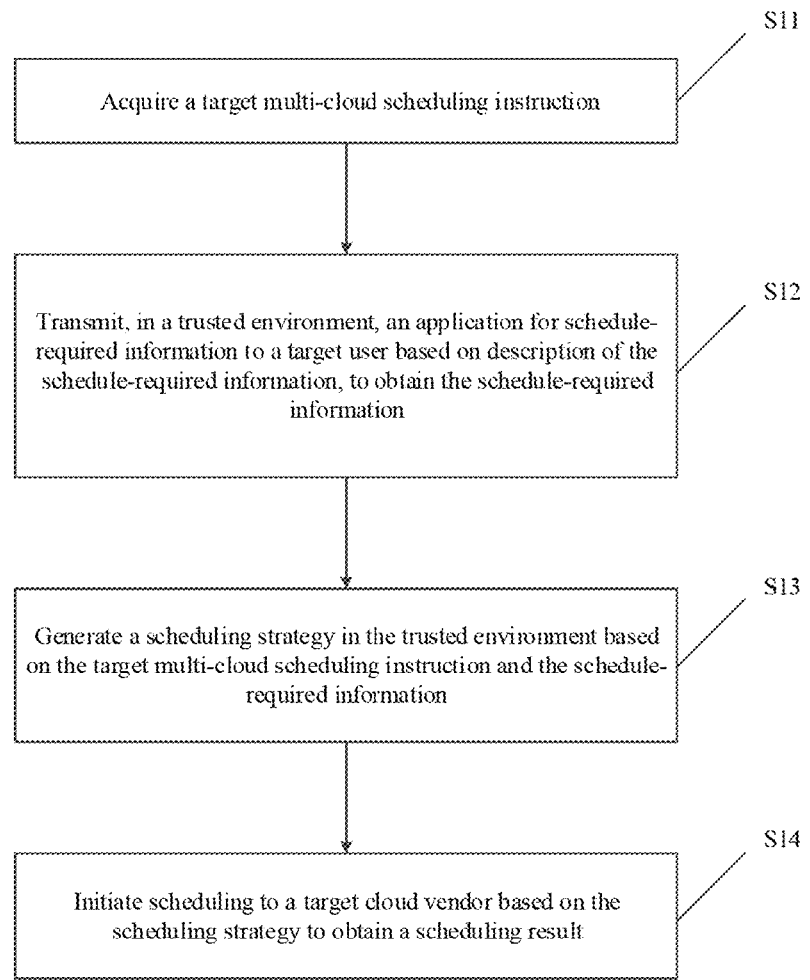
FIG. 3 is a flow chart of a method for processing a multi-cloud service according to an embodiment of the present disclosure.

The method for processing a multi-cloud service is provided according to the embodiment of the present disclosure, which may be applied to the above trusted environment executor and the like. FIG. 3 is a flow chart of a method for processing a multi-cloud service according to an embodiment of the present disclosure. As shown in FIG. 3, the method includes the following steps S11 to S14.

In step S11, a target multi-cloud scheduling instruction is acquired.

The target multi-cloud scheduling instruction includes a multi-cloud scheduling demand and description of the schedule-required information.

The multi-cloud scheduling demand is an objective of the multi-cloud service, such as adjusting scheduling resource allocation and configuring a domain name of CDN, which are determined according to actual requirements. The description of the schedule-required information is used to describe the schedule-required information, but does not include the content of the schedule-required information. As described above, the content of the schedule-required information is only exposed in a target user terminal and the trusted environment executor. Neither the interaction process between the multi-cloud service and the target user nor the interaction process between the multi-cloud service and the trusted environment executor involves the content of the schedule-required information. The schedule-required information includes but is not limited to AK and SK as described above.

The target multi-cloud scheduling instruction is transmitted by the multi-cloud service to the trusted environment executor, and the multi-cloud scheduling demand is processed in the trusted environment executor.

In step S12, an application for the schedule-required information is transmitted in the trusted environment to the target user based on the description of the schedule-required information, to obtain the schedule-required information.

The description of the schedule-required information includes the target user having the multi-cloud scheduling demand. Based on this, in order to obtain the schedule-required information, the application for the schedule-required information is transmitted in the trusted environment to the target user, to obtain the schedule-required information fed back from the target user.

The trusted environment executor directly acquires the schedule-required information from the target user, which is independent of the multi-cloud service. The tamper-resistant feature of the trusted environment may ensure the credibility of the schedule-required information.

In step S13, a scheduling strategy is generated in the trusted environment based on the target multi-cloud scheduling instruction and the schedule-required information.

The scheduling strategy is used to represent logic for implementing the scheduling. As the target multi-cloud scheduling instruction includes the multi-cloud scheduling demand, a type of scheduling to be implemented may be determined by analyzing the multi-cloud scheduling demand. Multiple logic frameworks for implementing the scheduling may be pre-configured in the trusted environment executor, and a target logic framework may be determined if matching the multi-cloud scheduling demand. Based on this, the multi-cloud scheduling demand and the content of the schedule-required information are filled, so as to generate the scheduling strategy that can achieve a corresponding function.

Alternatively, the pre-configured logic frameworks for implementing the scheduling may be deployed in another device, rather than being deployed in the trusted environment executor. The trusted environment executor communicates with the device to obtain the target logic framework.

In step S14, the scheduling is initiated to the target cloud vendor based on the scheduling strategy to obtain the scheduling result.

The trusted environment executor may, after generating the scheduling strategy, initiate the scheduling to the target cloud vendor based on the scheduling strategy. A scheduling interaction between the trusted environment executor and the target cloud vendor is implemented based on the scheduling strategy. Ultimately, the trusted environment executor acquires the scheduling result by virtue of the scheduling interaction defined by the scheduling strategy.

The scheduling result is to be fed back to the user. Therefore, the trusted environment executor feeds the scheduling result to the multi-cloud server, and then the multi-cloud server feeds the scheduling result to the target user.

In the method for processing a multi-cloud service according to the embodiment, the schedule-required information and the scheduling are processed in the trusted environment, and data in the trusted environment cannot be tampered with, making the scheduling be transparent and greatly improving the credibility of the scheduling service. In addition, the whole processing of the scheduling is performed in the trusted environment, forming a more complete and auditable trusted link.

Figure 4:
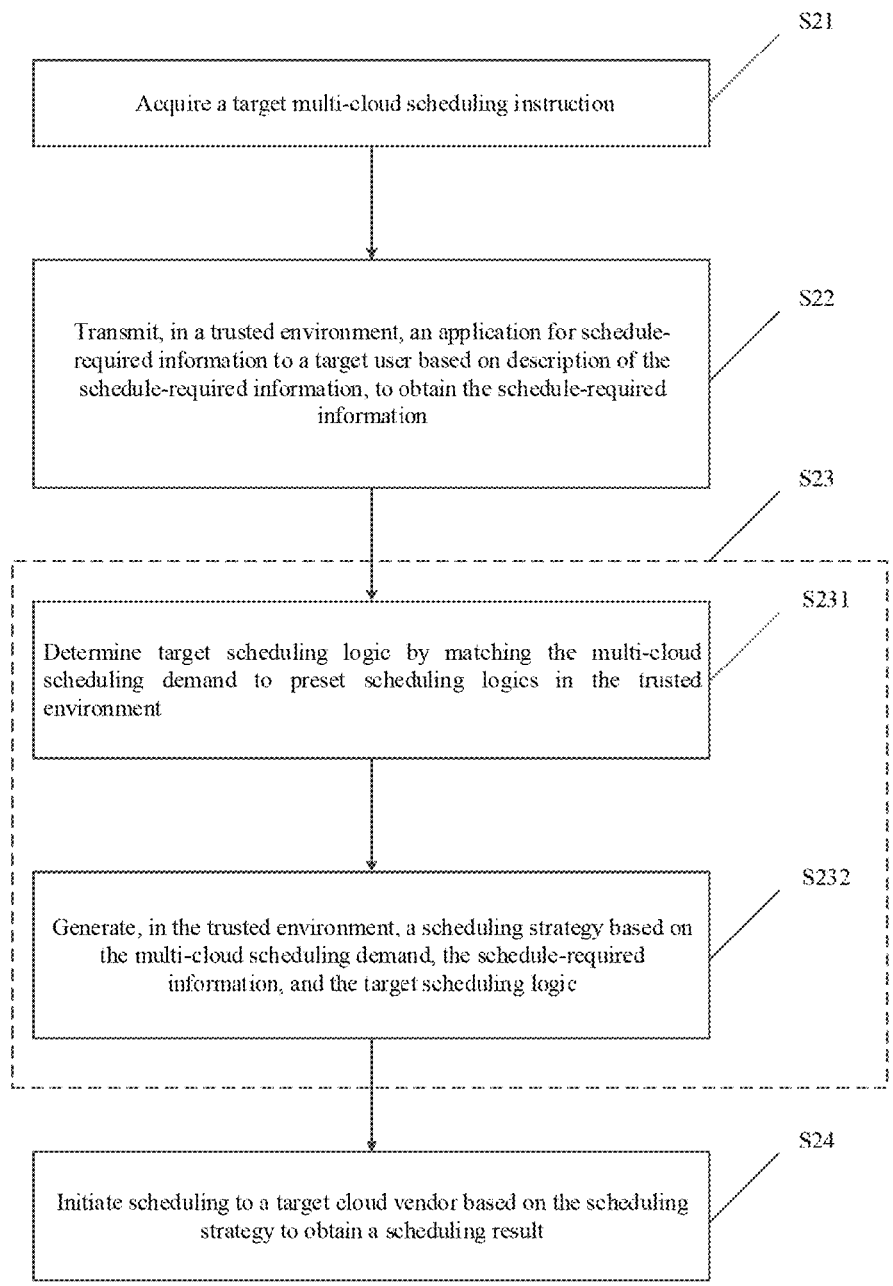
FIG. 4 is a flow chart of a method for processing a multi-cloud service according to an embodiment of the present disclosure.

A method for processing a multi-cloud service is provided according to an embodiment, and may be applied to the above trusted environment executor and the like. FIG. 4 is a flow chart of a method for processing a multi-cloud service according to an embodiment of the present disclosure. As shown in FIG. 4, the method includes the following steps S21 to S24.

In step S21, a target multi-cloud scheduling instruction is acquired.

The target multi-cloud scheduling instruction includes a multi-cloud scheduling demand and description of the schedule-required information.

Reference is made to the step S11 in the embodiment shown in FIG. 3 for details, which is not repeated herein.

In step S22, an application for the schedule-required information is transmitted in the trusted environment to the target user based on the description of the schedule-required information, to obtain the schedule-required information.

Reference is made to the step S12 in the embodiment shown in FIG. 3 for details, which is not repeated herein.

In step S23, a scheduling strategy is generated in the trusted environment based on the target multi-cloud scheduling instruction and the schedule-required information.

Specifically, the above step S23 includes the following steps S231 and S232.

In step S231, target scheduling logic is determined by matching the multi-cloud scheduling demand to preset scheduling logics in the trusted environment.

The preset scheduling logics enumerate multiple scheduling implementations set in the trusted environment in advance. In the trusted environment, the target scheduling logic is determined by matching the multi-cloud scheduling demand in the enumerations. For example, the multi-cloud scheduling demand is to adjust resource allocation, and the adjusting resource allocation may be represented by a unique identifier. In the trusted environment, the enumerations may be distinguished by the unique identifiers. Therefore, the target scheduling logic may be determined by matching of the unique identifiers.

In step S232, the scheduling strategy is generated in the trusted environment based on the multi-cloud scheduling demand, the schedule-required information, and the target scheduling logic.

For example, the multi-cloud scheduling demand is to schedule a CDN, and set a ratio of the CDN to be 20%, 30%, and 50%. The ratio is represented by the multi-cloud scheduling demand, and how to set the ratio is pre-configured in the trusted environment. Therefore, the scheduling strategy is generated by filling the ratio set in the multi-cloud scheduling demand and the schedule-required information into corresponding positions of the target scheduling logic.

In step S24, the scheduling is initiated to the target cloud vendor based on the scheduling strategy to obtain the scheduling result.

Reference is made to the step S14 in the embodiment shown in FIG. 3 for details, which is not repeated herein.

In the method for processing the multi-cloud service according to the embodiment, scheduling logics are preset in the trusted environment, the scheduling strategy is generated by matching the multi-cloud scheduling demand with the preset scheduling logics, thereby improving the efficiency of the multi-cloud scheduling.

In some embodiments, the method further includes: signing the scheduling result and storing the signed scheduling result in a chronological log database; and feeding back the scheduling result to the multi-cloud service in the trusted environment, to allow the multi-cloud service to feed back the scheduling result to the target user.

Every time the trusted environment executor executes an event or receives a result, the trusted environment executor signs the executed event or the received result, and stores a signature result in the chronological log database. The chronological log database stores the signature result strictly based on time. The user can extract data in a chronological order to obtain signature results arranged in the chronological order.

Specifically, the trusted environment executor, on receipt of the scheduling result fed back from the target cloud vendor, signs the scheduling result and stores the scheduling result in the chronological log database. Then, the scheduling result is fed back in the trusted environment to the multi-cloud service. Based on this, the multi-cloud service may feed back the scheduling result to the target user.

A key used in the signature may be a public key of the target user. Correspondingly, the target user may view a data processing process from the chronological log database with a private key of the user. In addition, the key used in the signature is not limited to a public-private key pair, but can be a key determined by negotiating with the target user, such as a quantum key.

The scheduling result is signed and stored in the chronological log database. On one hand, the signed scheduling result is not transparent to third parties, ensuring the reliability of the scheduling result. On the other hand, the chronological log database strictly stores in the chronological order, ensuring the traceability of the scheduling result.

In some embodiments, the above method further includes: signing, in the trusted environment, a first event of transmitting the schedule-required information to the target user, and storing a signature result of the first event in the chronological log database; signing, in the trusted environment, a second event of acquiring the schedule-required information, and storing a signature result of the second event in the chronological log database; or signing, in the trusted environment, a third event of initiating the scheduling to the target cloud vendor, and storing a signature result of the third event in the chronological log database.

The events processed by the trusted environment executor include the first event of transmitting the schedule-required information to the target user, the second event of acquiring the schedule-required information, and the third event of initiating the scheduling to the target cloud vendor. For each of the events processed by the trusted environment executor, the trusted environment executor signs the event and stores the signature result in the chronological log database.

It should be noted that each of the events is signed before or after the event occurs. For example, the first event is signed and stored before the first event occurs; and the second event is signed and stored before the second event occurs.

Figure 5:
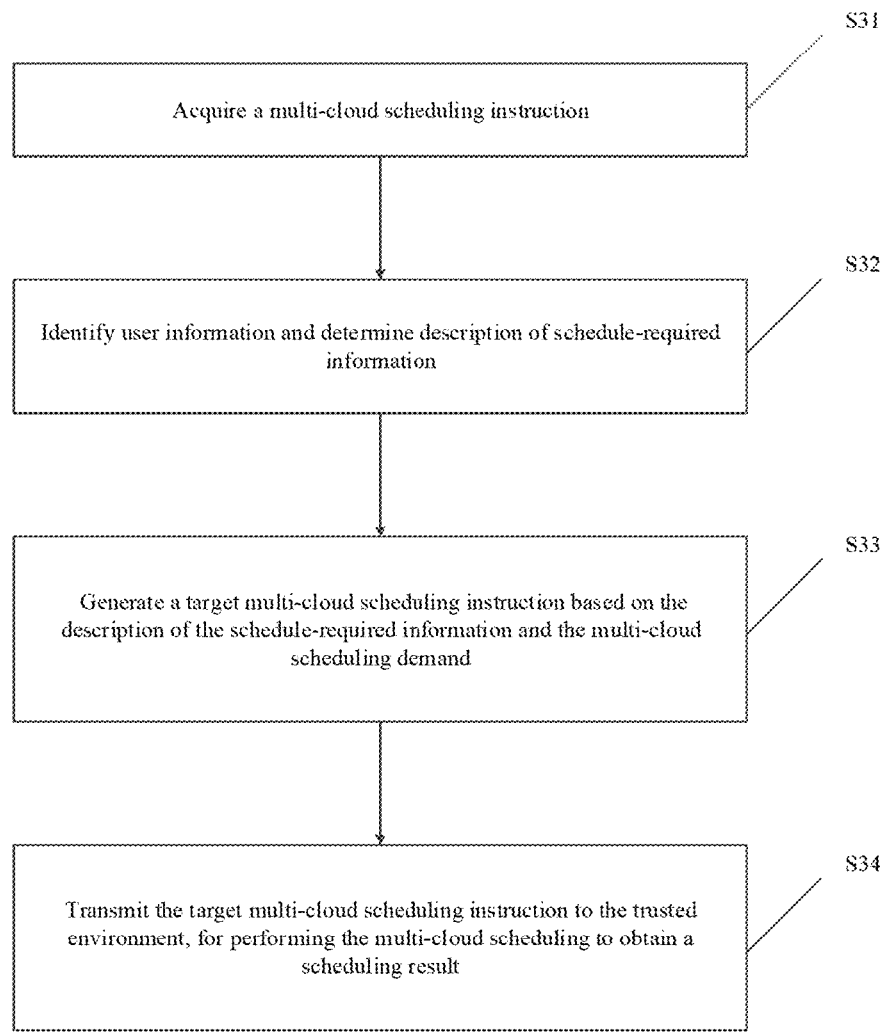
FIG. 5 is a flow chart of a method for processing a multi-cloud service according to an embodiment of the present disclosure.

A method for processing a multi-cloud service is provided according to an embodiment, and may be applied to the above multi-cloud server and the like. FIG. 5 is a flow chart of a method for processing a multi-cloud service according to an embodiment of the present disclosure. As shown in FIG. 5, the method includes the following steps S31 to S34.

In step S31, a multi-cloud scheduling instruction is acquired.

The multi-cloud scheduling instruction includes a multi-cloud scheduling demand and user information of the target user.

The multi-cloud scheduling instruction is transmitted from the target user to the multi-cloud server. The target user generates the multi-cloud scheduling instruction based on the multi-cloud scheduling demand and the user information. Accordingly, the multi-cloud scheduling instruction is acquired by the multi-cloud server. The user information includes but is not limited to an identifier of the target user and a name of the target cloud vendor.

In step S32, the user information is identified and the description of the schedule-required information is determined.

The user information is identified, and the description of the information including a vendor identifier and the user identifier is determined. The description is used to describe the schedule-required information, that is, which user acquires the schedule-required information from which cloud vendor.

In some embodiments, the step S32 includes: acquiring a user information database, where the user information database is used to store a correspondence between users and information descriptions; and searching in the user information database for the description of the schedule-required information based on the user information.

The user information database may be set in the multi-cloud server. The multi-cloud server may query the vendor identifier by using the name of the target cloud vendor in the user information. The vendor identifier is used to describe the target cloud vendor. The identifier of the target user in the user information is used to determine the target user.

The data interaction between the multi-cloud service and the trusted environment only involves the description of the schedule-required information, rather than involving the content of the schedule-required information. The content of the schedule-required information is only exposed to the target user and the trusted environment, improving the credibility of the schedule-required information.

In step S33, a target multi-cloud scheduling instruction is generated based on the description of the schedule-required information and the multi-cloud scheduling demand.

The multi-cloud server encapsulates the multi-cloud scheduling demand and the description of the schedule-required information, to generate the target multi-cloud scheduling instruction. An encapsulation format of the target multi-cloud scheduling instruction depends on a communication manner between the multi-cloud server and the trusted environment executor. The encapsulation format varies as the communication manner varies.

In step S34, the target multi-cloud scheduling instruction is transmitted to the trusted environment, for performing the multi-cloud scheduling to obtain the scheduling result.

On receipt of the target multi-cloud scheduling instruction, the multi-cloud server transmits the target multi-cloud scheduling instruction to the trusted environment executor, to execute the multi-cloud scheduling in the trusted environment. The processing of the multi-cloud scheduling by the trusted environment executor is described above, which is not repeated herein.

On receipt of the scheduling result transmitted by the trusted environment executor, the multi-cloud server feeds back the scheduling result to the target user.

In the method for processing the multi-cloud scheduling according to the embodiment, the interaction between the target user and the multi-cloud server only involves the description of the schedule-required information, rather than involving the content of the information, ensuring the credibility of the schedule-required information. The whole process of the multi-cloud scheduling is executed in the trusted environment, improving the credibility of the multi-cloud service.

Figure 6:
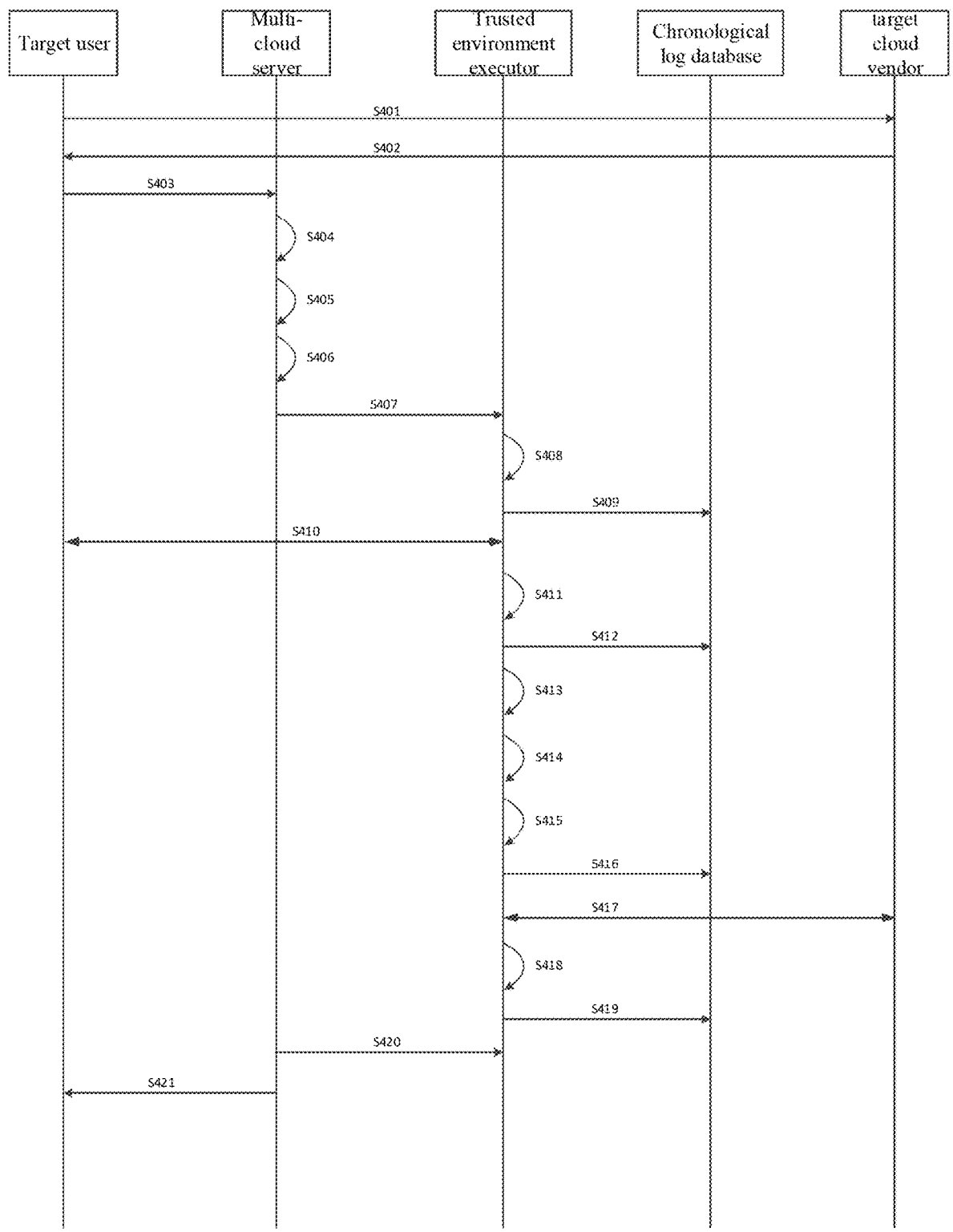
FIG. 6 is a flow chart of a method for processing a multi-cloud service according to an embodiment of the present disclosure.

A method for processing a multi-cloud service is provided according to an embodiment of the present disclosure. As shown in FIG. 6, the method includes the following steps S401 to S421.

In step S401, a target user applies for schedule-required information from a target cloud vendor.

In step S402, the target user receives the schedule-required information fed from the target cloud vendor.

In step S403, the target user transmits a multi-cloud scheduling instruction to a multi-cloud server. The multi-cloud scheduling instruction includes a multi-cloud scheduling demand and user information of the target user. This step corresponds to the step S31 in the embodiment shown in FIG. 5, and reference is made to the step S31 in the embodiment shown in FIG. 5 for details, which is not repeated herein.

In step S404, the multi-cloud server acquires a user information database. The user information database is used to store a correspondence between users and information descriptions. Reference is made to the step S32 in the embodiment shown in FIG. 5 for details, which is not repeated herein.

In step S405, the multi-cloud server searches in the user information database for the description of the schedule-required information based on user information. Reference is made to the step S32 in the embodiment shown in FIG. 5 for details, which is not repeated herein.

In step S406, the multi-cloud server generates a target multi-cloud scheduling instruction based on the description of the schedule-required information and the multi-cloud scheduling demand. Reference is made to the step S33 in the embodiment shown in FIG. 5 for details, which is not repeated herein.

In step S407, the multi-cloud server transmits the target multi-cloud scheduling instruction to the trusted environment, for performing the multi-cloud scheduling. Reference is made to the step S34 in the embodiment shown in FIG. 5 for details, which is not repeated herein.

In step S408, the trusted environment executor signs, in the trusted environment, a first event of transmitting the schedule-required information to the target user. Reference is made to corresponding description in the embodiment shown in FIG. 4 for details, which is not repeated herein.

In step S409, the trusted environment executor stores a signature result of the first event in the chronological log database. Reference is made to corresponding description in the embodiment shown in FIG. 4 for details, which is not repeated herein.

In step S410, the trusted environment executor transmits, in the trusted environment, an application for the schedule-required information to the target user based on the description of the schedule-required information, to obtain the schedule-required information. Reference is made to corresponding description in the embodiment shown in FIG. 4 for details, which is not repeated herein.

In step S411, the trusted environment executor signs, in the trusted environment, a second event of acquiring the schedule-required information. Reference is made to corresponding description in the embodiment shown in FIG. 4 for details, which is not repeated herein.

In step S412, the trusted environment executor stores a signature result of the second event in the chronological log database. Reference is made to corresponding description in the embodiment shown in FIG. 4 for details, which is not repeated herein.

In step S413, the trusted environment executor determines target scheduling logic by matching the multi-cloud scheduling demand to preset scheduling logics in the trusted environment. Reference is made to the step S231 in the embodiment shown in FIG. 4 for details, which is not repeated herein.

In step S414, the trusted environment executor generates a scheduling strategy based on the multi-cloud scheduling demand, the schedule-required information, and the target scheduling logic in the trusted environment. Reference is made to the step S232 in the embodiment shown in FIG. 4 for details, which is not repeated herein.

In step S415, the trusted environment executor signs, in the trusted environment, a third event of initiating the scheduling to the target cloud vendor. Reference is made to the corresponding description in the embodiment shown in FIG. 4 for details, which is not repeated herein.

In step S416, the trusted environment executor stores a signature result of the third event in the chronological log database. Reference is made to the corresponding description in the embodiment shown in FIG. 4 for details, which is not repeated herein.

In step S417, the trusted environment executor initiates the scheduling to the target cloud vendor based on the scheduling strategy to obtain a scheduling result. Reference is made to the corresponding description in the embodiment shown in FIG. 4 for details, which is not repeated herein.

In step S418, the trusted environment executor signs the scheduling result. Reference is made to the corresponding description in the embodiment shown in FIG. 4 for details, which is not repeated herein.

In step S419, the trusted environment executor stores a signature result of the scheduling result in the chronological log database. Reference is made to the corresponding description in the embodiment shown in FIG. 4 for details, which is not repeated herein.

In step S420, the trusted environment executor feeds, in the trusted environment, the scheduling result to the multi-cloud service. Reference is made to the step S24 in the embodiment shown in FIG. 4 for details, which is not repeated herein.

In step S421, the multi-cloud service feeds back the scheduling result to the target user. Reference is made to the corresponding description in the embodiment shown in FIG. 4 for details, which is not repeated herein.

In the method for processing a multi-cloud service according to the embodiment, the safe host of user AK and SK in in the multi-cloud service is ensured based on TEE trusted computing technology, ensuring the credibility and auditability of the entire link.

In the embodiment of the present disclosure, the target user first applies for AK and SK from the cloud vendor A, and then the multi-cloud scheduling demand for configuring a resource scheduling ratio is generated. The multi-cloud scheduling demand is combined with the user information to generate the multi-cloud scheduling instruction, and the multi-cloud scheduling instruction is transmitted to the multi-cloud server. The multi-cloud server identifies the multi-cloud scheduling instruction, and determines the description of the schedule-required information, generates the target multi-cloud scheduling instruction based on the description of the schedule-required information and the multi-cloud scheduling demand, and transmits the target multi-cloud scheduling instruction to the trusted environment executor. The trusted environment executor acquires the description of the schedule-required information based on the target multi-cloud scheduling instruction, and transmits the application for the schedule-required information to the target user based on the description. In such case, the trusted environment executor signs an event of transmitting the application for the schedule-required information to the target user, and then stores a signature result of the event in the chronological log database. The trusted environment executor acquires the schedule-required information fed back from the target user, signs an event of acquiring the schedule-required information and then stores a signature result of the event in the chronological log database. The trusted environment executor generates scheduling logic based on the target multi-cloud scheduling instruction and the schedule-required information, signs an event of generating the scheduling logic and then stores a signature result of the event in the chronological log database. The trusted environment executor initiates the scheduling logic to the target cloud vendor to obtain the scheduling result, signs an event of initiating the scheduling logic to the target cloud vendor and then stores a signature result of the event in the chronological log database. After obtaining the scheduling result, the trusted environment executor signs the scheduling result and then stores the signed scheduling result in the chronological log database. The trusted environment executor feeds back the scheduling result to the multi-cloud server. Accordingly, the multi-cloud server feeds back the scheduling result to the target user. Therefore, the target user may acquire the scheduling result of configuring the resource scheduling ratio.

An apparatus for processing a multi-cloud service is further provided according to an embodiment of the present disclosure. The apparatus is used to implement the above embodiments and the preferred embodiments, and repeated part is not described again. A term "module" used hereafter may be a combination of software and/or hardware that implements a predetermined function. Although an apparatus described in the following embodiments is preferably implemented by software, the apparatus may further be implemented by hardware or a combination of software and hardware.

Figure 7:
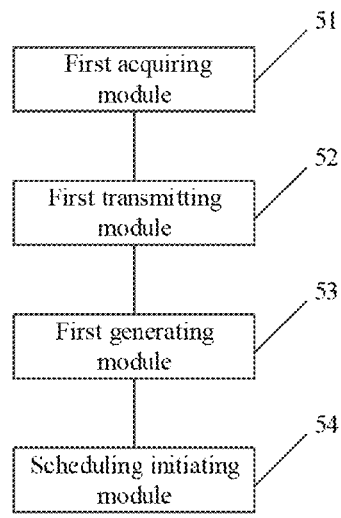
FIG. 7 is a structural block diagram of an apparatus for processing a multi-cloud service according to an embodiment of the present disclosure.

An apparatus for processing a multi-cloud service is further provided according to an embodiment of the present disclosure. As shown in FIG. 7, the apparatus includes a first acquiring module 51, a first transmitting module 52, a first generating module 53, and a scheduling initiating module 54.

The first acquiring module 51 is configured to acquire a target multi-cloud scheduling instruction, where the target multi-cloud scheduling instruction includes a multi-cloud scheduling demand and description of schedule-required information.

The first transmitting module 52 is configured to transmit, in a trusted environment, an application for the schedule-required information to a target user based on the description of the schedule-required information, to obtain the schedule-required information.

The first generating module 53 is configured to generate a scheduling strategy in the trusted environment based on the target multi-cloud scheduling instruction and the schedule-required information.

The scheduling initiating module 54 is configured to initiate scheduling to a target cloud vendor based on the scheduling strategy to obtain a scheduling result.

In some embodiments, the first generating module 53 includes a matching unit and a generating unit.

The matching unit is configured to determine target scheduling logic by matching the multi-cloud scheduling demand to preset scheduling logics in the trusted environment.

The generating unit is configured to generate, in the trusted environment, the scheduling strategy based on the multi-cloud scheduling demand, the schedule-required information, and the target scheduling logic.

In some embodiments, the apparatus further includes: a first storing module and a feedback module. The first storing module is configured to sign the scheduling result and storing the signed scheduling result in a chronological log database. The feedback module is configured to feed, in the trusted environment, the scheduling result to a multi-cloud service, to allow the multi-cloud service to feed back the scheduling result to the target user.

In some embodiments, the apparatus further includes: a first signing module, a second signing module and a third signing module.

The first signing module is configured to sign, in the trusted environment, a first event of transmitting the schedule-required information to the target user, and store a signature result of the first event in the chronological log database.

The second signing module is configured to sign, in the trusted environment, a second event of acquiring the schedule-required information, and store a signature result of the second event in the chronological log database The third signing module is configured to sign, in the trusted environment, a third event of initiating the scheduling to the target cloud vendor, and store a signature result of the third event in the chronological log database.

Figure 8:
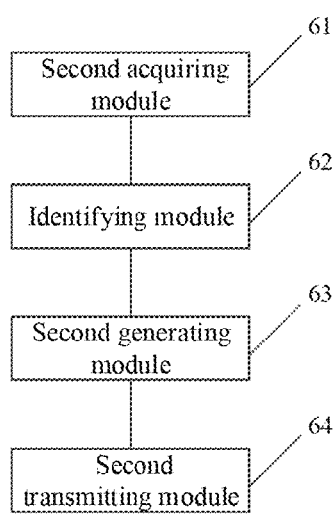
FIG. 8 is a structural block diagram of an apparatus for processing a multi-cloud service according to an embodiment of the present disclosure.

An apparatus for processing a multi-cloud service is provided according to an embodiment of the present disclosure. As shown in FIG. 8, the apparatus includes a second acquiring module 61, an identifying module 62, a second generating module 63, and a second transmitting module 64.

The second acquiring module 61 is configured to acquire a multi-cloud scheduling instruction, where the multi-cloud scheduling instruction includes a multi-cloud scheduling demand and user information of a target user.

The identifying module 62 is configured to identify the user information and determine description of schedule-required information.

The second generating module 63 is configured to generate a target multi-cloud scheduling instruction based on the description of the schedule-required information and the multi-cloud scheduling demand The second transmitting module 64 is configured to transmit the target multi-cloud scheduling instruction to the trusted environment, for performing the multi-cloud scheduling to obtain a scheduling result.

In some embodiments, the identifying module 62 includes an acquiring unit and a determining unit.

The acquiring unit is configured to acquire a user information database, where the user information database is used to store a correspondence between users and the information descriptions.

The determining unit is configured to search in the user information database for the description of the schedule-required information based on the user information.

The apparatus for processing a multi-cloud service according to the embodiment is described by functional units. The functional unit herein is an ASIC circuit, a processor and a memory that execute one or more software or fixed programs, and/or other devices that can provide the above functions.

The functional descriptions of the above modules are the same as descriptions in the corresponding embodiments described above, which are not repeated herein.

An electronic device is further provided according to an embodiment of the present disclosure. The electronic device includes the apparatus for processing a multi-cloud service as shown in FIG. 7 or 8.

Figure 9:
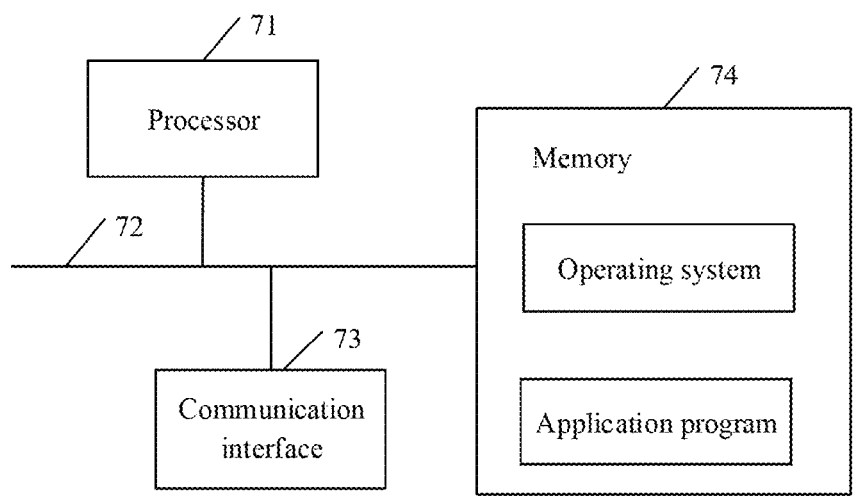
FIG. 9 is a schematic diagram of a hardware structure of an electronic device according to an embodiment of the present disclosure.

Reference is made to FIG. 9, which is a schematic structural diagram of a terminal according to an embodiment of the present disclosure. As shown in FIG. 9, the terminal includes at least one processor 71, such as a central processing unit (CPU), at least one communication interface 73, a memory 74, and at least one communication bus 72. The processor 71, the communication interface 73 and the memory 74 communicate with each other via the communication bus 72. The communication interface 73 may include a display and a keyboard. Alternatively, the communication interface 73 may further include a standard wired interface and a wireless interface. The memory 74 may be a high-speed random-access-memory (RAM) or a non-volatile memory, such as at least one disk storage. Alternatively, the memory 74 may further be at least one storage device located away from the processor 71. The processor 71 may be may be combined with the apparatus shown in FIG. 7 or FIG. 8. The memory 74 stores an application program. The processor 71 is configured to, when calling program codes stored in the memory 74, perform steps in any one of the methods.

The communication bus 72 may be a peripheral component interconnect (PCI) bus, an extended industry standard architecture (EISA) bus or the like. The communication bus 72 may be an address bus, a data bus, a control bus, or the like. For ease of representation, the bus is shown in FIG. 9 as one thick line, which does not indicate that there is only one bus or one type of bus.

The memory 74 may include the volatile memory, such as the random-access-memory (RAM), the memory may include the non-volatile memory, such as a flash memory, a hard disk drive (HDD), or a solid-state drive (SSD). The memory 74 may further include a combination of the above memories.

The processor 71 may be a central processing unit (CPU), a network processor (NP), or a combination of CPU and NP.

The processor 71 may further include a hardware chip. The hardware chip may be an application-specific integrated circuits (ASIC), a programmable logic device (PLD), or a combination thereof. The PLD may be a complex programmable logic device (CPLD), a field-programmable gate array (FPGA), a general array logic (GAL), or any combination thereof.

In an embodiment, the memory 74 is further configured to store program instructions. The processor 71, when calling the program instructions, performs the method for processing a multi-cloud service according to any one of embodiments of the present disclosure.

A non-transient computer storage medium is further provided according to an embodiment of the present disclosure. The non-transient computer storage medium stores computer-executable instructions. The computer-executable instructions may execute the method for processing a multi-cloud service according to any one of the embodiments. The storage medium may be a magnetic disk, an optical disc, a read-only-memory (ROM), a random-access-memory (RAM), a flash memory, a hard disk drive (HDD), a solid-state drive (SSD), or the like. The storage medium may further include a combination of the memories.

The embodiments in this specification are described in a progressive manner, the same and similar parts between embodiments may be referred to each other, and each of the embodiments focuses on the differences from other embodiments. Particularly, since embodiments of the method are substantially similar to the embodiments of the device and the system, the embodiments of the method are described briefly. For relevant parts, reference may be made to the descriptions of the embodiments of the device and the system.

It can be understood that data related to the multi-cloud scheduling and the user information is involved in the specific implementation of the present disclosure. When the above embodiments of the present disclosure are applied to a specific product or technology, permission or consent of the user is required, and collection, use, and processing of the related data must comply with relevant laws, regulations, and standards of relevant country and region.

Although the embodiments of the present disclosure are described in conjunction with the drawings, various modifications and variations may be made to these embodiments by those skilled in the art without departing from the spirit and scope of the present disclosure. Such modifications and variations are all within the scope defined by the claims.

The invention claimed is:

1. A method for processing a multi-cloud service, comprising:
   acquiring a target multi-cloud scheduling instruction, wherein the target multi-cloud scheduling instruction comprises a multi-cloud scheduling demand and description of schedule-required information;
   transmitting, in a trusted environment, an application for the schedule-required information to a target user based on the description of the schedule-required information, to obtain the schedule-required information;
   generating a scheduling strategy in the trusted environment based on the target multi-cloud scheduling instruction and the schedule-required information; and initiating scheduling to a target cloud vendor based on the scheduling strategy, to obtain a scheduling result.

2. The method according to claim 1, wherein the generating the scheduling strategy in the trusted environment based on the target multi-cloud scheduling instruction and the schedule-required information comprises:
   determining a target scheduling logic by matching, in the trusted environment, the multi-cloud scheduling demand to preset scheduling logics; and
   generating, in the trusted environment, the scheduling strategy based on the multi-cloud scheduling demand, the schedule-required information, and the target scheduling logic.

3. An electronic device, comprising a memory and a processor, wherein
   the memory is communicatively connected to the processor, the memory stores computer instructions, and the processor, when executing the computer instructions, performs the method for processing the multi-cloud service according to claim 2.

4. A non-transitory computer-readable storage medium, storing computer instructions, wherein
   the computer instructions are configured to cause a computer to perform the method for processing a multi-cloud service according to claim 2.

5. The method according to claim 1, further comprising:
   signing the scheduling result and storing the signed scheduling result in a chronological log database; and
   feeding, in the trusted environment, the scheduling result back to the multi-cloud service, to allow the multi-cloud service feed the scheduling result to the target user.

6. The method according to claim 5, further comprising:
   signing, in the trusted environment, a first event of transmitting the schedule-required information to the target user, and storing a signature result of the first event in the chronological log database;
   signing, in the trusted environment, a second event of acquiring the schedule-required information, and storing a signature result of the second event in the chronological log database; and
   signing, in the trusted environment, a third event of initiating the scheduling to the target cloud vendor, and storing a signature result of the third event in the chronological log database.

7. An electronic device, comprising a memory and a processor, wherein
   the memory is communicatively connected to the processor, the memory stores computer instructions, and the processor, when executing the computer instructions, performs the method for processing the multi-cloud service according to claim 6.

8. A non-transitory computer-readable storage medium, storing computer instructions, wherein
   the computer instructions are configured to cause a computer to perform the method for processing a multi-cloud service according to claim 6.

9. An electronic device, comprising a memory and a processor, wherein
   the memory is communicatively connected to the processor, the memory stores computer instructions, and the processor, when executing the computer instructions, performs the method for processing the multi-cloud service according to claim 5.

10. A non-transitory computer-readable storage medium, storing computer instructions, wherein
    the computer instructions are configured to cause a computer to perform the method for processing a multi-cloud service according to claim 5.

11. An electronic device, comprising a memory and a processor, wherein
    the memory is communicatively connected to the processor, the memory stores computer instructions, and the processor, when executing the computer instructions, performs the method for processing a multi-cloud service according to claim 1.

12. A non-transitory computer-readable storage medium, storing computer instructions, wherein
    the computer instructions are configured to cause a computer to perform the method for processing a multi-cloud service according to claim 1.

13. A method for processing a multi-cloud service, comprising:
    acquiring a multi-cloud scheduling instruction, wherein the multi-cloud scheduling instruction comprises a multi-cloud scheduling demand and user information of a target user;
    identifying the user information and determining description of schedule-required information;
    generating a target multi-cloud scheduling instruction based on the description of the schedule-required information and the multi-cloud scheduling demand; and
    transmitting the target multi-cloud scheduling instruction to the trusted environment, for performing multi-cloud scheduling to obtain a scheduling result.

14. The method according to claim 13, wherein the identifying the user information and determining the description of the schedule-required information comprises:
    acquiring a user information database, wherein the user information database is used to store a correspondence between users and the information descriptions; and
    searching in the user information database for the description of the schedule-required information based on the user information.

15. An electronic device, comprising a memory and a processor, wherein
    the memory is communicatively connected to the processor, the memory stores computer instructions, and the processor, when executing the computer instructions, performs the method for processing the multi-cloud service according to claim 14.

16. A non-transitory computer-readable storage medium, storing computer instructions, wherein
    the computer instructions are configured to cause a computer to perform the method for processing a multi-cloud service according to claim 14.

17. An electronic device, comprising a memory and a processor, wherein
    the memory is communicatively connected to the processor, the memory stores computer instructions, and the processor, when executing the computer instructions, performs the method for processing the multi-cloud service according to claim 13.

18. A non-transitory computer-readable storage medium, storing computer instructions, wherein
    the computer instructions are configured to cause a computer to perform the method for processing a multi-cloud service according to claim 13.

19. A system for processing a multi-cloud service, comprising:
    a multi-cloud server, configured to perform:

acquiring a multi-cloud scheduling instruction, wherein the multi-cloud scheduling instruction comprises a multi-cloud scheduling demand and user information of a target user;
identifying the user information and determining description of schedule-required information;
generating a target multi-cloud scheduling instruction based on the description of the schedule-required information and the multi-cloud scheduling demand; and
transmitting the target multi-cloud scheduling instruction to the trusted environment, for performing multi-cloud scheduling to obtain a scheduling result; and
a trusted environment executor, connected to the multi-cloud server, and configured to perform:
acquiring a target multi-cloud scheduling instruction, wherein the target multi-cloud scheduling instruction comprises a multi-cloud scheduling demand and description of schedule-required information;
transmitting, in a trusted environment, an application for the schedule-required information to a target user based on the description of the schedule-required information, to obtain the schedule-required information;
generating a scheduling strategy in the trusted environment based on the target multi-cloud scheduling instruction and the schedule-required information; and
initiating scheduling to a target cloud vendor based on the scheduling strategy, to obtain a scheduling result.

20. The system according to claim 19, wherein the trusted environment executor is further configured to implement:
determining a target scheduling logic by matching, in the trusted environment, the multi-cloud scheduling demand to preset scheduling logics; and
generating, in the trusted environment, the scheduling strategy based on the multi-cloud scheduling demand, the schedule-required information, and the target scheduling logic.

* * * * *